US012737144B2

(12) United States Patent
Brock et al.

(10) Patent No.: US 12,737,144 B2
(45) **Date of Patent: *Sep. 15, 2026**

(54) UTILIZATION OF A PRINTHEAD RESISTANCE SENSOR AND A MODEL TO DETERMINE A PRINTER STATUS

(71) Applicant: ZEBRA TECHNOLOGIES CORPORATION, Lincolnshire, IL (US)

(72) Inventors: Ryan E. Brock, Cary, IL (US); Yan Zhang, Buffalo Grove, IL (US)

(73) Assignee: Zebra Technologies Corporation, Lincolnshire, IL (US)

(*) Notice: Subject to any disclaimer, the term of this patent is extended or adjusted under 35 U.S.C. 154(b) by 175 days.

This patent is subject to a terminal disclaimer.

(21) Appl. No.: 18/613,627

(22) Filed: Mar. 22, 2024

(65) Prior Publication Data

US 2024/0231714 A1 Jul. 11, 2024

Related U.S. Application Data

(63) Continuation of application No. 17/547,813, filed on Dec. 10, 2021, now Pat. No. 11,941,308.

(51) Int. Cl.
*G06F 3/12* (2006.01)
*B41J 2/045* (2006.01)
(Continued)

(52) U.S. Cl.
CPC ............ *G06F 3/121* (2013.01); *B41J 2/0451* (2013.01); *B41J 2/04536* (2013.01); *B41J 2/0458* (2013.01); *G06F 3/1208* (2013.01); *G06F 3/1229* (2013.01); *G06F 3/1234* (2013.01); *G06F 3/1273* (2013.01); *G06N 20/00* (2019.01); *G06T 7/001* (2013.01); *G06T 2207/20081* (2013.01); *G06T 2207/30144* (2013.01)

(58) Field of Classification Search
CPC ...... G06F 3/121; G06F 3/1208; G06F 3/1229; G06F 3/1234; G06F 3/1273; B41J 2/0451; B41J 2/04536; B41J 2/0458; G06N 20/00; G06N 3/088; G06N 3/0464; G06N 3/09; G06T 7/001; G06T 2207/20081; G06T 2207/30144; G06T 2207/20084; G06T 7/0004; G06V 30/133
See application file for complete search history.

(56) References Cited

U.S. PATENT DOCUMENTS

2013/0215210 A1* 8/2013 McNestry ................ B41J 33/36 347/214

* cited by examiner

*Primary Examiner* — Ricardo I Magallanes
*Assistant Examiner* — Tracey M Mcmillion

(57) ABSTRACT

In some implementations, a device may receive print data associated with a printer. The device may receive an image that depicts content that is printed on media by the printer. The device may determine, using a printhead analysis model, a status of a printhead of the printer based on the print data and a characteristic of the content, wherein the printhead analysis model is trained based on reference data associated with historical printing operations associated with one or more printers, wherein the reference data includes reference images associated with printed content from the historical printing operations and corresponding resistance measurements for one or more respective printheads of the one or more printers. The device may perform, based on the status, an action associated with the printhead of the printer.

12 Claims, 7 Drawing Sheets

(51) Int. Cl.
*G06N 20/00* (2019.01)
*G06T 7/00* (2017.01)

700

UTILIZATION OF A PRINTHEAD RESISTANCE SENSOR AND A MODEL TO DETERMINE A PRINTER STATUS

RELATED APPLICATIONS

The present application is a continuation of U.S. patent application Ser. No. 17/547,813, filed on Dec. 10, 2021, which is incorporated by reference herein in its entirety.

BACKGROUND

Over time, wear and tear on a printer may degrade a quality of content printed by the printer and/or may cause printing anomalies that prevent the content from being legible or useable. For example, wear and tear on a barcode printer may prevent a barcode reader from being able to decode a barcode printed by the barcode printer. To ensure that a printer is capable of printing content with a certain level of quality, there is a need to detect or predict when a printer may require service or maintenance to avoid printing low-quality content (e.g., unreadable barcodes, unreadable text, low-resolution images, anomalous images, or other types of low-quality content).

SUMMARY

Some implementations described herein relate to a method for determining a printhead status. The method may include receiving, by a device, print data associated with a printer. The method may include receiving, by the device, an image that depicts content that is printed on media by the printer. The method may include determining, by the device and using a printhead analysis model, a status of a printhead of the printer based on the print data and a characteristic of the content, where the printhead analysis model is trained based on reference data associated with historical printing operations associated with one or more printers, where the reference data includes reference images associated with printed content from the historical printing operations and corresponding resistance measurements for one or more respective printheads of the one or more printers. The method may include performing, by the device and based on the status, an action associated with the printhead of the printer.

Some implementations described herein relate to a device. The device may include one or more memories and one or more processors coupled to the one or more memories. The device may be configured to receive print data associated with a printer. The device may be configured to receive an image that depicts content that is printed on media by the printer. The device may be configured to determine, using a printhead analysis model, a status of a printhead of the printer based on the print data and a characteristic of the content. The device may be configured to perform, based on the status, an action associated with the printhead of the printer.

Some implementations described herein relate to a tangible machine-readable medium that stores a set of instructions for a device. The set of instructions, when executed by one or more processors of the device, may cause the device to receive print data associated with a printer. The set of instructions, when executed by one or more processors of the device, may cause the device to receive an image that depicts content that is printed on media by the printer. The set of instructions, when executed by one or more processors of the device, may cause the device to determine, using a printhead analysis model, a status of a printhead of the printer based on the print data and a characteristic of the content. The set of instructions, when executed by one or more processors of the device, may cause the device to perform, based on the status, an action associated with the printhead of the printer.

DETAILED DESCRIPTION

Figure 1:
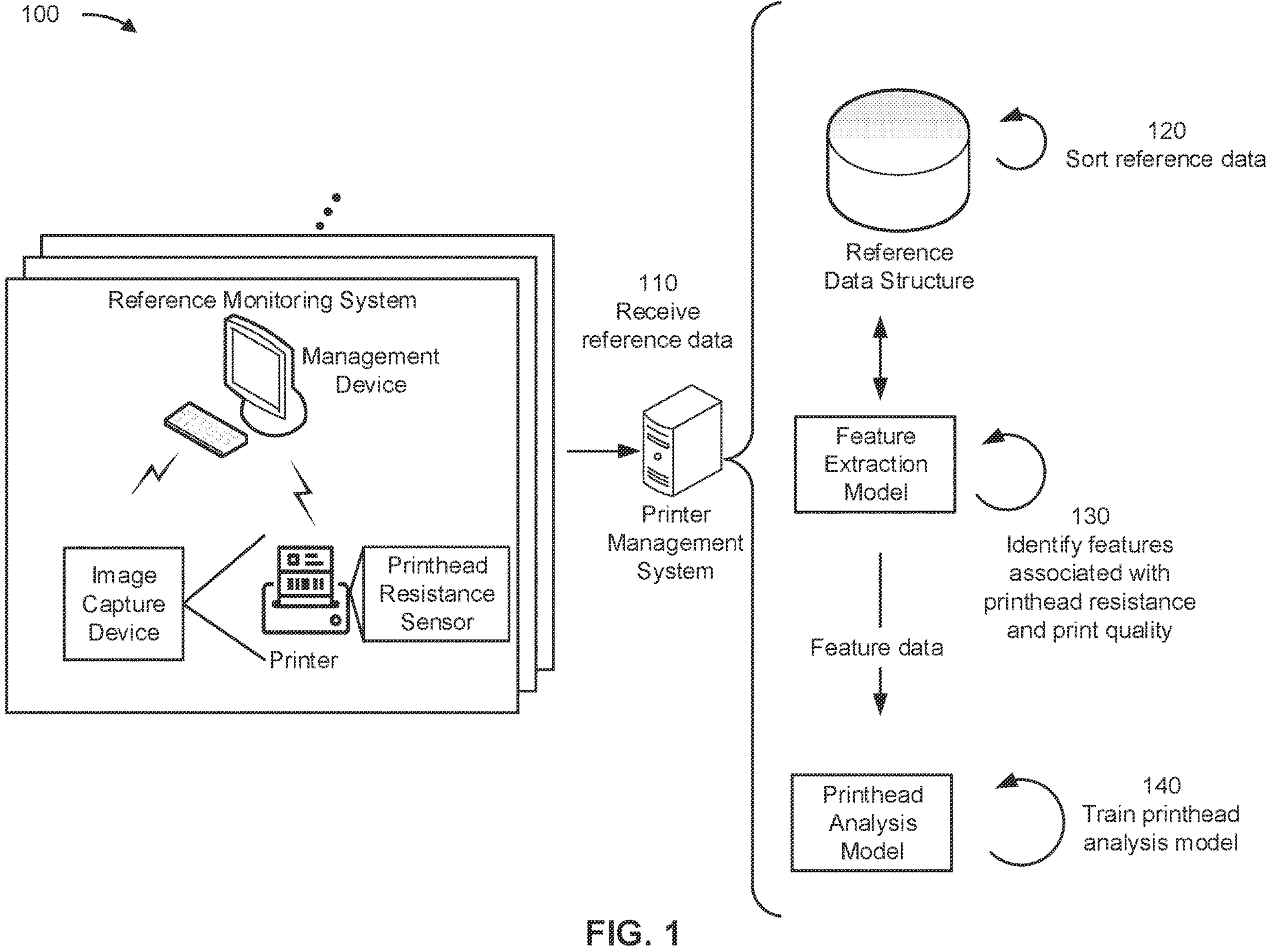
FIG. 1 is a diagram of an example implementation associated with a printhead analysis model described herein.

The following detailed description of example implementations refers to the accompanying drawings. The same reference numbers in different drawings may identify the same or similar elements.

A printer may be used in a variety of applications to provide printed content on media (e.g., paper (rolls or individual sheets), cardboard, or other types of material). For example, a printer can print labels that are to be associated with objects in order to provide and/or indicate information associated with the objects (e.g., products, inventory, samples, supplies, consumables, and/or the like). In some instances, another device or system may be configured to read the labels in order to process the objects (e.g., to identify the objects, to sort the objects, to select the objects for transportation, or to perform some other activity involving the objects). Over time, a print quality of a label (or other content) may degrade due to wear and tear on the printer. However, degradation of a print quality of a label may not be detected (e.g., by a technician and/or an automated self-maintenance operation) until an issue with a printer gets so severe that printed labels are undetectable and/or unreadable. In such cases, the printer may need to be shut down for servicing, which results in delays and/or other costs associated with generating labels for objects or printing content on media.

In some cases, a system (e.g., a quality control system, a diagnostic system, a monitoring system, or the like) may utilize an image processing technique that analyzes an image of printed content to detect anomalies within the printed content. Such processing techniques can indicate that a printer may be experiencing an issue that will result in a low-quality label being printed or can predict that the printer is about to experience such an issue (e.g., based on detecting the anomaly). However, such processing techniques may not be configured to accurately indicate a particular type of issue that the printer may be experiencing or accurately determine whether the issue is related to a printhead of the printer that is experiencing a particular problem. Accordingly, there is a need for a system that is capable of accurately detecting, based on an analysis of printed content, that a printer that printed the content is experiencing a printhead-related issue and/or predicting that the printhead is about to experience an issue (e.g., within a threshold time period or within a threshold quantity of printing operations).

Some implementations described herein provide a printer management system that utilizes a printhead resistance sensor to accurately determine and/or predict a status of a printhead of a printer. For example, the printer management system may utilize and/or provide a printhead analysis model that is configured to detect an anomaly associated with a printhead based on an analysis of an image that depicts content printed via the printhead and/or based on a resistance measurement of the printhead (e.g., a resistance measurement associated with the printhead printing one or more pixels of the content). The printhead analysis model may more accurately detect and/or predict an issue that is specifically associated with a printhead relative to other models that utilize only image processing techniques. In some implementations, the printhead analysis model may utilize fewer resources relative to other models to detect or predict a printhead related issue by utilizing the printhead resistance measurements from a printhead resistance sensor of the printer (and/or print data for a printing operation) to predict an anomaly or issue related with the printhead.

In this way, a printer management system (and/or a user device or a printer), as described herein, may quickly and/or accurately detect an issue associated with a printhead of the printer (and/or detect that a printhead is about to experience an issue within a threshold time period or within a threshold quantity of print operations) using images and/or resistance measurements associated with the printhead or other printheads of other printers (e.g., printers associated with historical printing operations that are used to train the printhead analysis model as described herein). Accordingly, as described herein, the printer management system may reduce a likelihood that a printhead experiences a severe enough issue that would require the printer to be shut down (e.g., during a production run), thereby improving efficiency of the printer (e.g., by enabling scheduling of maintenance to repair or replace the printhead during planned shutdowns or a slow production run) and enabling more accurate predictions for printhead maintenance requirements and/or appropriately scheduled maintenance on the printhead. Moreover, the printer management system may analyze image data and/or printhead resistance measurements that can more quickly or more accurately detect a printing anomaly associated with content that is printed by a printhead (e.g., a printing anomaly that is indicative of the printer experiencing a particular issue) to indicate that the printed content may include degraded content.

The printer may be a thermal printer that is configured to print content on thermal sensitive media using a thermal printhead. The thermal printhead may include an array of printing elements that print the content to the thermal sensitive media based on respective resistances applied to the printing elements (e.g., one or more resistors or other components with resistive properties) as the thermal sensitive media passes or comes into contact with the printing elements. The printer may apply the respective resistances to the printing elements according to print data associated with a printing instruction and/or printing operation.

FIG. 1 is a diagram of an example implementation 100 associated with a printhead analysis model described herein. As shown in FIG. 1, example implementation 100 includes a printer management system and one or more reference monitoring systems that may include a printer, a user device, and an image capture device (e.g., a camera or other type of imager). One or more of the printers of the reference monitoring systems may include a printhead resistance sensor that is configured to measure resistances of printing elements of a printhead (which may be referred to herein as a printhead resistance). These devices may be further described below, at least in connection with FIG. 5 and FIG. 6.

In example implementation 100, the printer management system includes a reference data structure, a feature extraction model, and a printhead analysis model. As described herein, the printer management system (and/or another associated system) may train the printhead analysis model based on historical printing operations performed by one or more of the printers of the reference monitoring systems, printhead statuses associated with the corresponding printer that performed the respective historical printing operations, and/or images of content printed via the historical printing operations.

As shown in FIG. 1, and by reference number 110, the printer management system receives reference data. The reference data may include print data associated with historical printing operations performed by the printers, image data associated with reference images from the image capture devices that depict printed content from the historical printing operations, resistance measurements associated with printheads from the printers (and/or printhead resistance sensors), and/or corresponding printer statuses of the printers.

In some implementations, the image data may include a grade associated with a print quality of content printed during a historical printing operation. The grade may have been assigned by a user of the user device and/or automatically assigned by a quality control system that is configured to monitor performance of the one or more printers. In some implementations, the reference images (or a subset of the references images) may depict content associated with and/or that includes one or more printing anomalies. In this way, the reference data may indicate information associated with printing anomalies identified in the printed content (e.g., to permit the feature extraction model to identify features associated with the image data, resistance measurements, printing anomalies, and/or printer statuses, as described elsewhere herein).

The printer statuses may indicate usage history associated with the printer and/or a printhead of the printer. Accordingly, the printer status may indicate whether one or more printers of the reference monitoring systems include or are associated with printheads with anomalous (e.g., damaged or altered) printing elements, performance of a threshold quantity of printing operations, usage for a threshold length of time, a certain type of printer, a certain type of use, and/or a certain make/model/manufacture, among other examples. The printer statuses may be associated with historical conditions of the printers during a time period associated with the printers performing the historical printing operations. The printer statuses may be received from the printers (e.g., based on being configured to log and/or track printing operations or usage, based on the printers experiencing an error within a threshold time period after performing the historical printing operations, or the like). Additionally, or alternatively, the printer statuses may be indicated by a user via the user device (e.g., in association with a supervised learning technique). The printer statuses may identify one or more types of printing issues (or errors) experienced by the printers during respective time periods during which the historical printing operations were performed. For example, such printing issues may include faulty printing elements, misaligned printheads or other components of the printer, wrinkled printing media that received the printed content, and/or development of dust or other printing inhibitors, among other examples.

As further shown in FIG. 1, and by reference number 120, the printer management system may sort the reference data. For example, the printer management system may sort the reference data according to printer quality identified or determined from the image data associated with the printed content (e.g., the image depicting the printed content and/or a grade assigned to the printed content). The printer management system may sort the reference data into a set that indicates a first subset of the historical printing operations that resulted in relatively high-quality content and a second subset of the historical printing operations that resulted in relatively low-quality content. In this way, the printer management system may permit the feature extraction model to efficiently extract features associated with the resistance measurements and/or print data for relatively low-quality content and/or features associated with the resistance measurements and/or print data for relatively high-quality content.

In some implementations, the printer management system may sort the reference data according to one or more subsets of the reference data. More specifically, the printer management system may sort the reference data based on a usage history of the printers. Accordingly, if the reference data is associated with multiple printers, the printer management system may sort the reference data into a first set associated with a first set of printers with printheads that have been used in no more than a threshold quantity of print operations (or for no longer than a length of time), a second set associated with a second set of printers with printheads that have been used in more than the threshold quantity of print operations (or for longer than the threshold length of time). In such a case, the printer management system may sort the reference data according to the printer statuses of the reference data including or indicating the respective historical printhead statuses associated with the respective printheads of the printers during the historical printing operations.

As further shown in FIG. 1, and by reference number 130, the printer management system (e.g., via the feature extraction model) identifies features associated with printhead resistances and/or print quality. For example, the feature extraction model may be configured to recognize a trend and/or a pattern associated with certain printing anomalies and/or resistance measurements being associated with certain printer statuses (e.g., statuses that are indicative of a printhead issue).

In some implementations, the feature extraction model may be associated with a machine learning model (e.g., a support vector machine, a regression model, a neural network, a clustering model, a prediction model, and/or a generator model). For example, the printer management system may use a classification model (e.g., a clustering model and/or a regression model) to classify the image data and/or resistance measurements into a particular class. Relative to a printing issue, a first class may be associated with content that was printed by a printer having a first printing issue or prior to the printer having the first printing issue, a second class may be associated with content that was printed by a printer having a second printing issue or prior to the printer having the second issue, and so on.

In some implementations, the feature extraction model may be configured to map resistance measurements from one or more of the printhead resistance sensors to a certain printing anomaly identified in content that is printed by one of the printers. For example, the feature extraction model may include or be associated with a computer vision model (e.g., a convolutional neural network) that is configured to classify the image data into a particular class. The image data may be associated with reference images that depict content relating to certain printing anomalies. A first class may be associated with content that was printed with a first type of printing anomaly, a second class may be associated with content that was printed with a second type of printing anomaly, and so on. In some implementations, the computer vision model may utilize an image recognition technique (e.g., an Inception framework, a ResNet framework, a Visual Geometry Group (VGG) framework, and/or the like), and/or an object detection technique (e.g., a Single Shot Detector (SSD) framework, a You Only Look Once (YOLO) framework, and/or the like), among other examples. Types of printing anomalies may include a degradation associated with lightened print or faded print, content distortion, broken or disjointed lines (e.g., lines associated with a barcode), low contrast content, print/mark inconsistency, grid non-uniformity, axial non-uniformity, and/or a poor or low content grade (e.g., a barcode grade that is below a certain threshold associated with a standard).

The feature extraction model may output and/or provide feature data to the printhead analysis model. The feature data may include sets of reference resistance measurements and/or reference printing anomalies that are determined to be associated with certain printer statuses and/or sets of reference resistance measurements and/or printer statuses that are determined to be associated with certain printing anomalies that are identified in printed content.

As further shown in FIG. 1, and by reference number 140, the printer management system trains the printhead analysis model. For example, the printer management system may train the printhead analysis model based on the identified features associated with the printing anomalies, the printhead resistance measurements, and/or the print data being associated with certain printer statuses and/or certain printhead statuses.

The printhead analysis model may be trained to identify printhead resistance(s) (e.g., from resistance measurements) that are associated with and/or correspond to particular printing anomalies that are indicative of a printhead experiencing an issue. The issue may be one of a plurality of types of issues that are likely to cause the printhead to print unreadable barcodes during subsequent printing operations (e.g., subsequent printing operations performed within a threshold time period and/or subsequent printing operations that would be within a next threshold quantity of printing operations). For example, the printer management system may train the machine learning model based on the reference data associated with historical printing operations (e.g., reference images and/or corresponding reference printhead resistance measurements). In some implementations, the printhead analysis model may be trained to identify (e.g., using a computer vision model) patterns and/or trends associated with performances of historical printing operations of a printer (e.g., based on timestamp data, location data, and/or other metadata associated with the historical printing operations).

In some implementations, the printer management system may receive the printhead analysis model from another system after the printer management system is trained. For example, the other system may obtain the reference data associated with the one or more printers and/or the historical printing operations and provide the printhead analysis model to the printer management system to permit the printer management system to utilize the printhead analysis model. Additionally, or alternatively, the printhead analysis model may be configured to be locally installed on a printer and/or a user device associated with the printer, as described elsewhere herein. The printhead analysis model may be trained and/or utilized as described in more detail in connection with FIG. 4.

The printhead analysis model may learn and/or maintain sets of reference resistance measurements that are associated with a printhead status that is indicative of whether a printhead of the printer is experiencing an issue that potentially could affect a quality of subsequently printed content. In this way, the printhead analysis model may be trained and/or configured to be used to analyze image data and/or resistance sensor measurements to monitor and/or determine a printhead status associated with a printhead (as further described at least in connection with FIG. 2).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
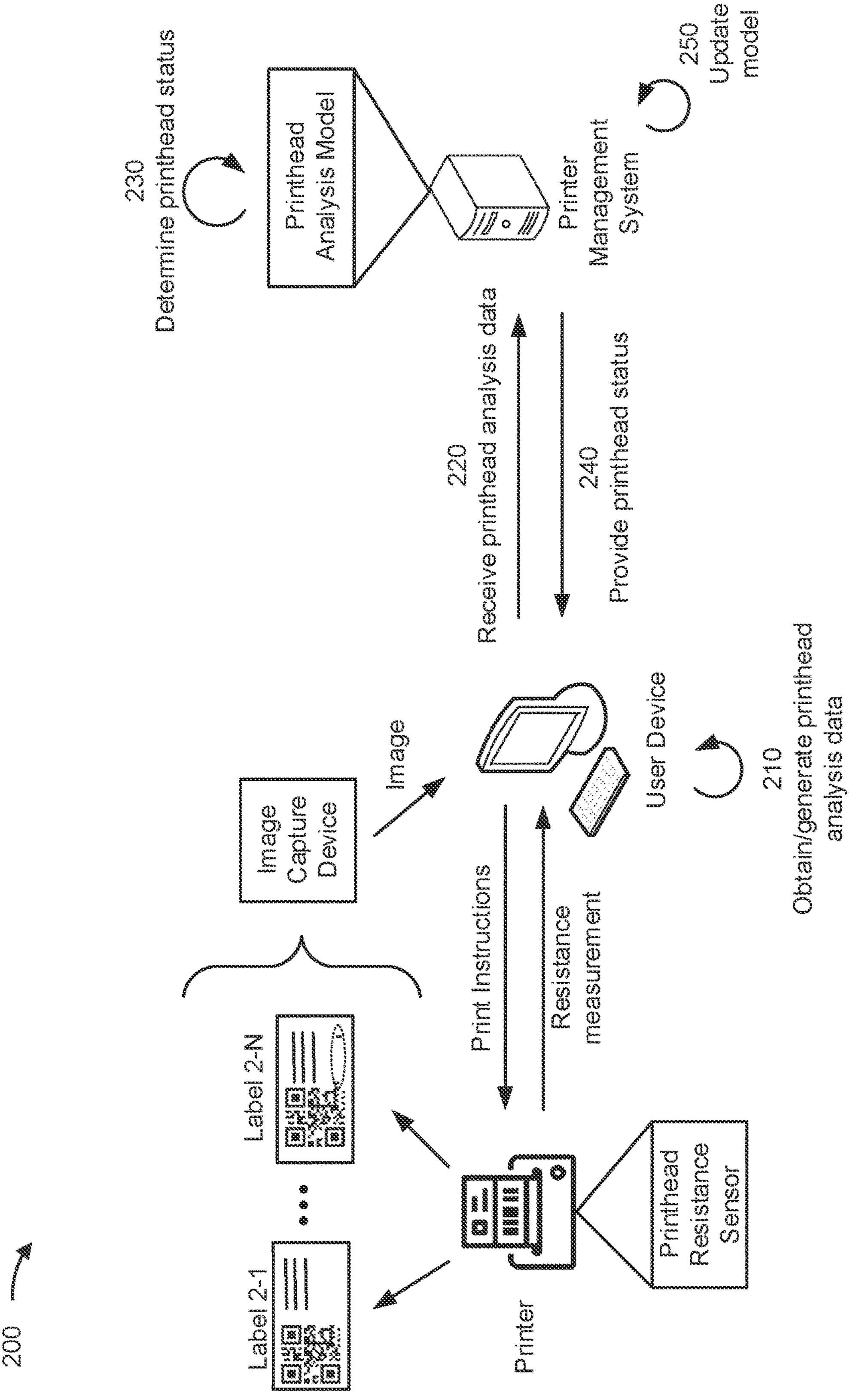
FIG. 2 is a diagram of an example implementation of utilizing a printhead resistance sensor and/or a printhead analysis model described herein.

FIG. 2 is a diagram of an example implementation 200 associated with a printhead resistance sensor and/or a printhead analysis model. As shown in FIG. 2, example implementation 200 includes a user device, a printer, an image capture device, and a printer management system. These devices may correspond to the devices in example implementation 100 and/or one or more of the devices described in connection with FIGS. 5 and 6.

In example implementation 200, the printer may be configured to print a plurality of labels over time, where a first label is shown as Label 2-1 and a second label is shown as Label 2-N, where N may correspond to an Nth printed label (or a most recently printed label during a time period associated with example implementation 200). The labels may be printed based on corresponding print instructions that are received from the user device. The printer may print the labels based on print data identified within the print instructions and/or print data that is determined from the print instructions (e.g., by the printer). The user device and/or the printer management system may iteratively perform one or more processes described herein in connection with each printing operation that is performed by the printer to print the individual labels.

As shown in FIG. 2, and by reference number 210, the user device may obtain and/or generate printhead analysis data from the printer and/or the image capture device. The printhead analysis data may be associated with a printing operation that is performed by the printer to print one or more of the labels.

The printhead analysis data may include image data that the user device receives from the image device. The image data may include and/or be associated with an image that depicts content that is printed on media by the printer. For example, the image data may include an image that depicts a label (e.g., Label 2-N) that is printed by the printer via the printing operation that is associated with a printing instruction (e.g., a printing instruction to print Label 2-N).

In some implementations, the printhead analysis data may include a resistance measurement of a printhead of the printer that is received from and/or generated by a printhead resistance sensor of the printer. The printhead resistance sensor may be configured to measure the resistance of printing elements of the printhead in association with the printer performing the printing operation and/or based on the printer performing the printing operation (e.g., similar to the printhead resistance sensor described in connection with example implementation 100). Accordingly, the resistance measurement may correspond to a resistance measurement associated with a printing element of the printhead that was captured before, during, and/or after the printer performed the printing operation.

The printhead analysis data may include the print instruction for the printing operation and/or the print data associated with the print instruction. For example, the user device may associate the print instruction that was provided to the printer and/or the print data received from the printer (e.g., the print data that is generated by the printer to print the label according to the print instruction).

The user device may generate the printhead analysis data to enable the printhead analysis model to process the printhead analysis data to determine a printhead status associated with the printhead. For example, the user device may aggregate and/or synchronize (e.g., based on the print instruction and/or the printing operation) the printhead analysis data into a file and/or an entry that can be used by the location management system (e.g., via the printhead analysis model) to determine a status of the printhead. The user device may assign an identifier to the printhead analysis data that indicates that the printhead analysis data is associated with a particular printing operation that is performed by the printer. The identifier may be a unique identifier (e.g., relative to other printers and/or printing operations associated with printers that are managed or monitored by the printer management system) that permits the printer management system to identify that the printhead analysis data is associated with the printer and/or the printing operation.

In this way, the user device may process the obtained image data, the resistance measurement, and/or the print instruction to enable the printhead analysis model to determine a status of the printhead of the user device (e.g., according to how the reference data is sorted, as described in connection with FIG. 1).

As further shown in FIG. 2, and by reference number 220, the printer management system receives the printhead analysis data. For example, as shown, the printer management system may receive the printhead analysis data from the user device. In some implementations, the printer management system may obtain the printhead analysis data from the printer and/or the image capture device. The printer management system may receive the printhead analysis data based on the printer performing the printing operation and/or the user device obtaining and generating the printhead analysis data.

In some implementations, the printer management system may receive the printhead analysis data that is associated with a plurality of printing operations (e.g., via a batch processing technique). For example, the printer management system may be configured to receive the printhead analysis data after the printer performs a particular number of printing operations. Additionally, or alternatively, the printer management system may be configured to receive the printhead analysis data periodically and/or according to a schedule, such that the printing analysis data is associated with a time period between providing a current batch of printhead analysis data and a previous batch.

In this way, the printer management system may receive printhead analysis data associated with one or more printing operations to permit the printer management system to determine a status of a printhead (or printing element of the printhead) of the printer based on the printhead analysis data.

As further shown in FIG. 2, and by reference number 230, the location management system determines the printhead status of a printhead of the printer. For example, the location management system may utilize the printhead analysis model to analyze the printhead analysis data.

The location management system, using the printhead analysis model, may process the printhead analysis data to determine a status of the printhead. For example, the status of the printhead (which may be referred to herein as a "printhead status") may indicate whether the printhead is causing or is likely to cause (e.g., during a future printing operation within a threshold period of time and/or a threshold quantity of future printing operations) the printer to print a label that includes printing anomalies or certain types of print anomalous content (e.g., content that would degrade the quality of the label and/or render certain content unreadable). In some implementations, the status of the printhead may indicate a type of issue and/or which printing elements are experiencing an issue (e.g., based on which pixels in the image indicate that the content includes a printing anomaly, as determined by the printhead analysis model). For example, based on the printhead analysis model processing the printhead analysis data associated with a printing operation of the printer, the printer management system may accurately predict whether the printer is experiencing or likely to experience a printhead issue that may result in the printer printing anomalous content and/or unreadable content. In this way, the printhead analysis model, based on the image data and/or being trained based on historical resistance measurements, may permit the printer to alter settings to address and/or mitigate the printhead issue (e.g., by causing the printhead to increase or decrease a resistance setting associated with a future printing operation). Additionally, or alternatively, the printhead analysis model may permit a user of the printer management system to notify a user of the user device and/or a technician to perform corresponding maintenance to address and/or mitigate that type of printing issue, as described elsewhere herein.

Referring to the example barcodes of FIG. 2, the printer management system may utilize the printhead analysis model to determine, from image data associated with a first printing operation performed to print a first label (Label 2-1), that the printer is not experiencing or is not likely to experience a printhead issue associated with printing readable content within a subsequent threshold time period (e.g., because the image data may indicate that the printing operations resulted in printing non-anomalous content). In some implementations, the printer management system may utilize the printhead analysis model and resistance measurements associated with the first printing operation to determine that the printer is not experiencing or is not likely to experience a printhead issue associated with printing readable content within the subsequent threshold time period (e.g., because the resistance measurements may indicate that the printing operations resulted in printing non-anomalous content).

On the other hand, the location management system may utilize the printhead analysis model to determine, from image data associated with a second printing operation to print a second label (Label 1-N), that the printer is experiencing or is likely to experience an issue associated with printing readable barcodes within a subsequent threshold time period (e.g., because the printhead analysis model may identify an anomaly (shown by a dotted line) that indicates that the printhead experienced an issue during the second printing operation that resulted in the anomaly). In some implementations, the printer management system may utilize the printhead analysis model and the resistance measurements associated with the printing operation to detect and/or predict that the label includes the anomaly (e.g., because the resistance measurements, as processed by the printhead analysis model, may indicate that the second printing operation resulted in printing the anomaly).

As further shown in FIG. 2, and by reference number 240, the printer management system provides a printhead status to the user device. For example, the printer management system may provide a notification that includes the status of the printhead to indicate whether the printhead is to be replaced and/or requires maintenance. Additionally, or alternatively, the printer management system may indicate via a user interface (e.g., a user interface associated with the user device and/or a management device associated with the printer management system) the status of the printhead to indicate whether the printhead is to be replaced or requires maintenance.

As further shown in FIG. 2, and by reference number 250, the printer management system may update the model. For example, the printer management system may retrain the printhead analysis model to analyze the printhead based on the received printhead analysis data associated with the printing operation. In this way, the printer management system may continuously and iteratively update the printhead analysis model (e.g., for each printhead operation and/or batch of printhead analysis data) to improve the accuracy of the printhead analysis model.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
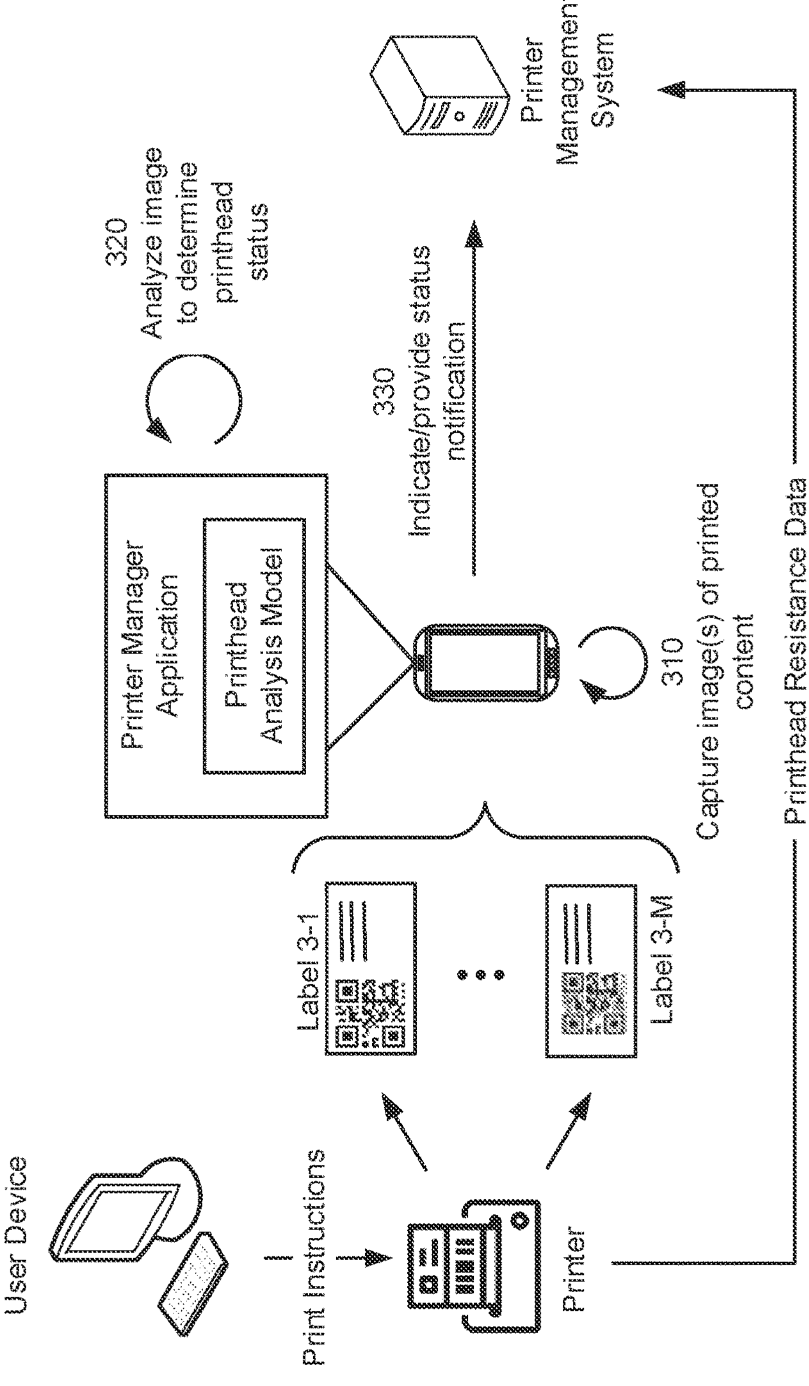
FIG. 3 is a diagram of another example implementation of utilizing a printhead resistance sensor and/or a printhead analysis model described herein.

FIG. 3 is a diagram of an example implementation 300 associated with a printhead analysis model described herein. As shown in FIG. 3, example implementation 300 includes a user device, a printer, an image capture device, and a printer management system.

The user device may include an application (e.g., Printer Manager Application) that is associated with the printer management system. For example, the printer management system may be associated with a backend system of the application, and the user device may include a user-side version of the application that enables the user to interact with the printer and/or the printer management system (e.g., via a user account that is associated with the user and/or the printer). The user account and/or the application may be used by an entity (e.g., a service provider associated with the printer, such as a manufacturer of the printer or other organization that provides printer services) associated with the printer management system to provide a service to the user. Additionally, or alternatively, the user may receive a service provided by the entity via the user account and/or the application.

In some implementations, the printhead analysis model may be associated with the application. For example, the printhead analysis model may be installed within the user device based on the user device downloading and/or installing the application. The application may include one or more user interfaces that permit a user to perform one or more operations in association with determining a printhead status of the printer, as described herein. For example, the application may include a user interface that permits the user to utilize a camera of the user device (or other type of image capture device of the user device) to capture an image of labels (shown as Label 3-1 to Label 3-M) that are printed by the printer.

As shown in FIG. 3, and by reference number 310, the user device captures an image of content printed by the printer. For example, after the printer prints a label, the user device may capture an image of the label using the application and/or the camera of the user device in order to permit the printhead analysis model to determine a printhead status of the printer, as described herein. In some implementations, the user device may obtain a print instruction and/or print data associated with the printed label from the user device. Additionally, or alternatively, the user device may obtain a resistance measurement from the printer that is associated with the printing operation performed to print the label. In this way, the user device may obtain image data (or other types of printhead analysis data) to permit the user device to determine a printhead status of a printhead of the printer as described elsewhere herein.

As further shown in FIG. 3, and by reference number 320, the user device may analyze an image to determine a printhead status. For example, the user device may analyze the image and/or other printhead analysis data associated with a printing operation (e.g., print data, the printing instruction, and/or one or more resistance measurements of the printhead). To permit the user device to use the printhead analysis model to diagnose potential issues with a printhead (or printing element of the printhead) of the printer, the user device may have received (e.g., downloaded) the printhead analysis model from the printer management system (e.g., after the printhead analysis model was trained as described elsewhere herein) and/or installed the printhead analysis model (e.g., in association with the application) within the user device (e.g., within or in association with an application of the user device). In this way, the user device may be configured to utilize the printhead analysis model to determine the printhead status as described elsewhere herein.

As further shown in FIG. 3, and by reference number 330, the user device may indicate and/or provide a status notification. For example, the user device may indicate the status notification via a user interface (e.g., a graphical user interface associated with the application and/or a display device) of the user device. Additionally, or alternatively, the user device may provide or send the status notification to the printer management system to indicate the status (e.g., to permit a representative of an entity associated the printer management system to address any issue identified within and/or associated with the printhead status).

As indicated above, FIG. 3 is provided as an example. Other examples may differ from what is described with regard to FIG. 3.

Figure 4:
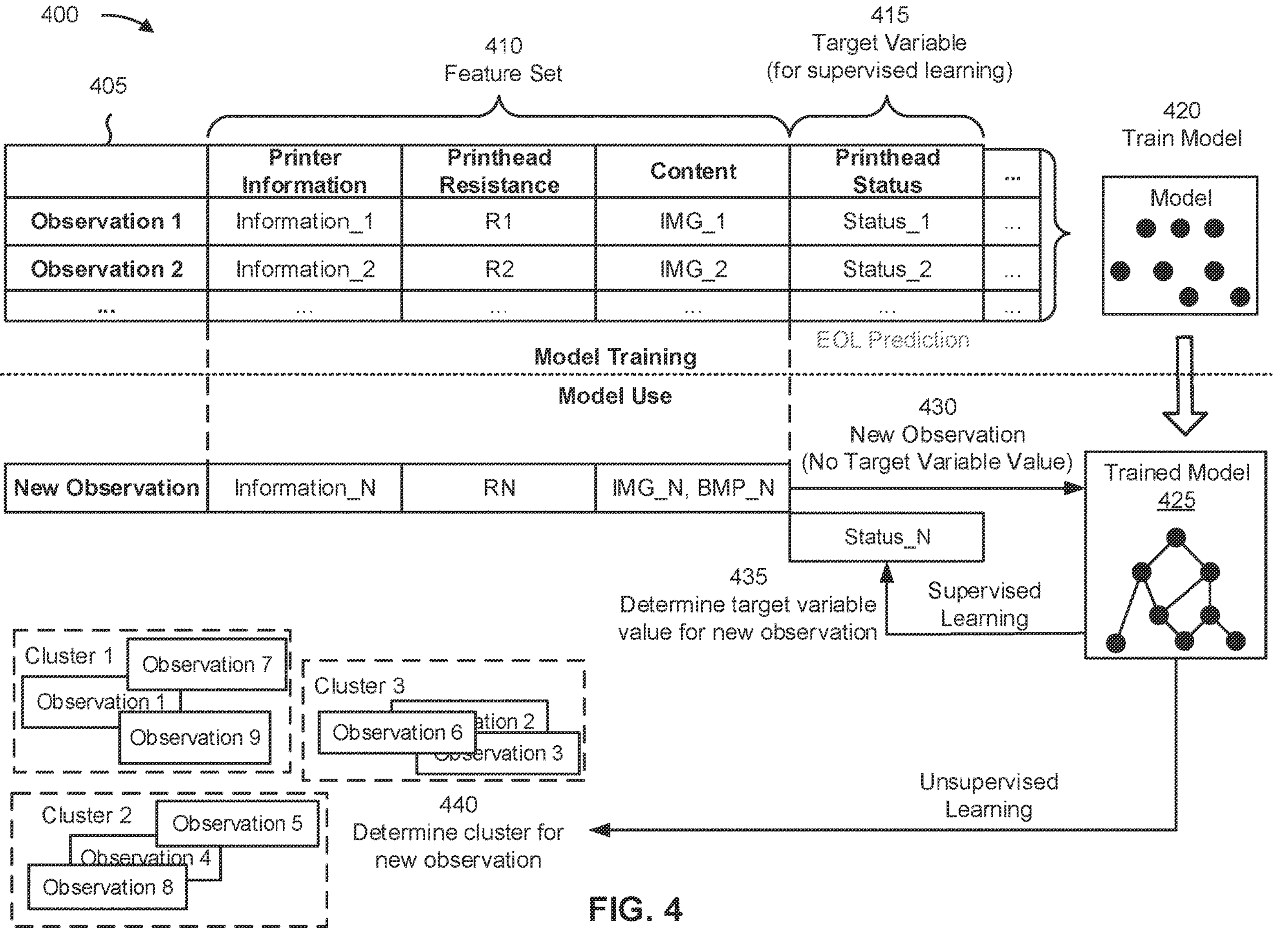
FIG. 4 is a diagram illustrating an example of training and using a machine learning model described herein.

FIG. 4 is a diagram illustrating an example 400 of training and using a machine learning model in connection with determining a status of a printhead of a printer. The machine learning model training and usage described herein may be performed using a machine learning system. The machine learning system may include or may be included in a computing device, a server, a cloud computing environment, or the like, such as the printer management system described in more detail elsewhere herein.

As shown by reference number 405, a machine learning model may be trained using a set of observations. The set of observations may be obtained from training data (e.g., historical data), such as data gathered during one or more processes described herein. In some implementations, the machine learning system may receive the set of observations (e.g., as input) from one or more devices of reference monitoring systems, such as one or more image capture devices, one or more printers, and/or one or more management devices, as described elsewhere herein.

As shown by reference number 410, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a resistance measurement sensor of a printer, the printer, an image capture device, and/or a management device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of printer information, a second feature of a printhead resistance, a third feature of content, and so on. As shown, for a first observation, the first feature may have a value of Information_1 (e.g., corresponding to information associated with a printer of observation 1, such as an identifier of the printer, a location of the printer, a type of the printer, a usage history of the printer, or the like), the second feature may have a value of R1 (e.g., corresponding to a value of a resistance measurement for the first observation), the third feature may have a value of IMG_1 (e.g., corresponding to an image depicting content printed in association with a printing operation of the first observation), and so on. These features and feature values are provided as examples, and may differ in other examples. For example, the feature set may include one or more of the following features: print data associated with a print instruction associated with the printing operation, timing associated with the printing operation, a location associated with the printer, an entity associated with the printer, a usage history associated with the printer, and/or a type of the printer, among other examples.

As shown by reference number 415, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 400, the target variable is printhead status, which has a value of Status_1 for the first observation (e.g., corresponding to whether the printhead experienced an issue when performing the printing operation associated with the first observation).

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 420, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 425 to be used to analyze new observations.

As shown by reference number 430, the machine learning system may apply the trained machine learning model 425 to a new observation, such as by receiving a new observation and inputting the new observation to the trained machine learning model 425. As shown, the new observation may include a first feature of printer information, a second feature of a printhead resistance, a third feature of content, and so on, as an example. The machine learning system may apply the trained machine learning model 425 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 425 may predict a value of Status_N for the target variable of Printhead Status for the new observation, as shown by reference number 435. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to perform a certain type of maintenance on the printhead, a recommendation to replace the printhead, and/or a recommendation to adjust a setting of the printhead. The first automated action may include, for example, automatically perform a printer maintenance operation (e.g., to clean the printing elements of the printhead, to improve accuracy associated with setting resistances of printing elements of the printhead, or the like), and/or automatically causing the printer to adjust the setting of the printhead.

In some implementations, the trained machine learning model 425 may classify (e.g., cluster) the new observation in a cluster, as shown by reference number 440. The observations within a cluster may have a threshold degree of similarity. As an example, if the machine learning system classifies the new observation in a first cluster (e.g., a cluster that indicates that printhead associated with the printer experienced a particular printhead issue during the printing operation of the new observation), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a cluster that indicates that a printhead associated with the printer did not experience a printhead issue during the printing operation of the new observation), then the machine learning system may provide a second (e.g., different) recommendation (e.g., a recommendation to continue to monitor for printhead issues via printhead resistance measurements and/or images of printed content) and/or may perform or cause performance of a second (e.g., different) automated action, such as send a status notification that indicates that the printhead did not experience an issue during the printing operation associated with the new observation.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determine a printhead status of a printer in association with printhead resistance measurements and/or a printhead resistance sensor. The machine learning system enables recognition and/or identification of tens, hundreds, thousands, or millions of features and/or feature values for tens, hundreds, thousands, or millions of observations associated with printers, thereby increasing accuracy and consistency and reducing delay associated with detecting printhead issues and/or determining printhead statuses relative to requiring computing resources to be allocated for tens, hundreds, or thousands of operators to manually detect printhead issues and/or determine printhead statuses using the features or feature values.

As indicated above, FIG. 4 is provided as an example. Other examples may differ from what is described in connection with FIG. 4.

Figure 5:
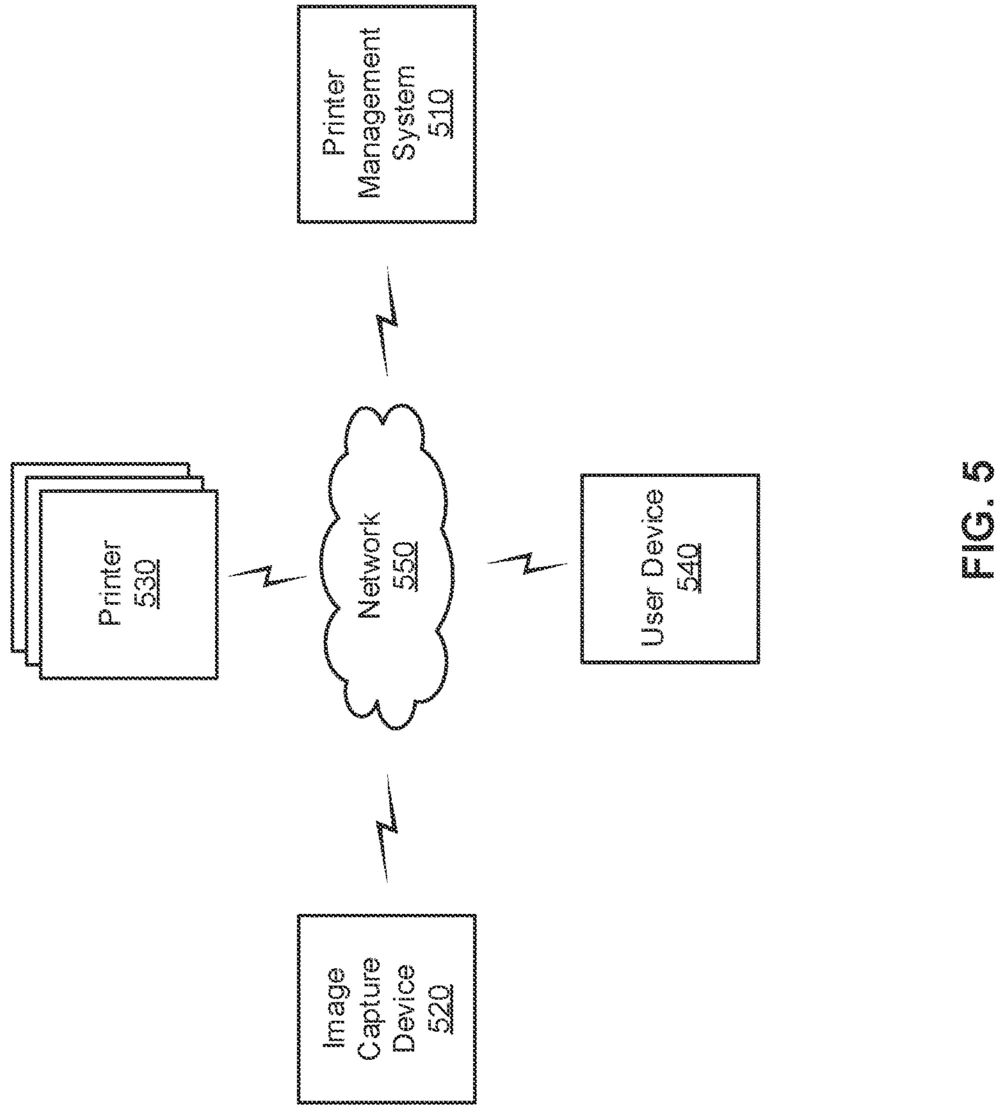
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a printer management system 510, an image capture device 520, one or more printers 530, a user device 540, and a network 550. Devices of environment 500 may interconnect via wired connections, wireless connections, or a combination of wired and wireless connections.

The printer management system 510 includes one or more devices capable of receiving, generating, storing, processing, providing, and/or routing information associated with a printhead resistance sensor and a model to determine a printer status and/or printhead status, as described elsewhere herein. The printer management system 510 may include a communication device and/or a computing device. For example, the printer management system 510 may include a server, such as an application server, a client server, a web server, a database server, a host server, a proxy server, a virtual server (e.g., executing on computing hardware), or a server in a cloud computing system. In some implementations, the printer management system 510 includes computing hardware used in a cloud computing environment.

The image capture device 520 includes one or more devices capable of receiving, generating, storing, processing, and/or providing information associated with images that depict printed content and/or that are analyzed to determine a printhead status associated with a printhead resistance, as described elsewhere herein. The image capture device 520 may include a communication device and/or a computing device. For example, the image capture device 520 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The printer 530 includes one or more devices capable of receiving, generating, storing, processing, and/or providing information associated with a printhead that is managed and/or analyzed, as described elsewhere herein. The printer 530 may include a communication device and/or a computing device that enables communication with one or more of the other devices of environment 500.

The user device 540 includes one or more devices capable of receiving, generating, storing, processing, and/or providing information associated with managing a printer and/or a printhead, as described elsewhere herein. The user device 540 may include a communication device and/or a computing device. For example, the user device 540 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 550 includes one or more wired and/or wireless networks. For example, the network 550 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 550 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
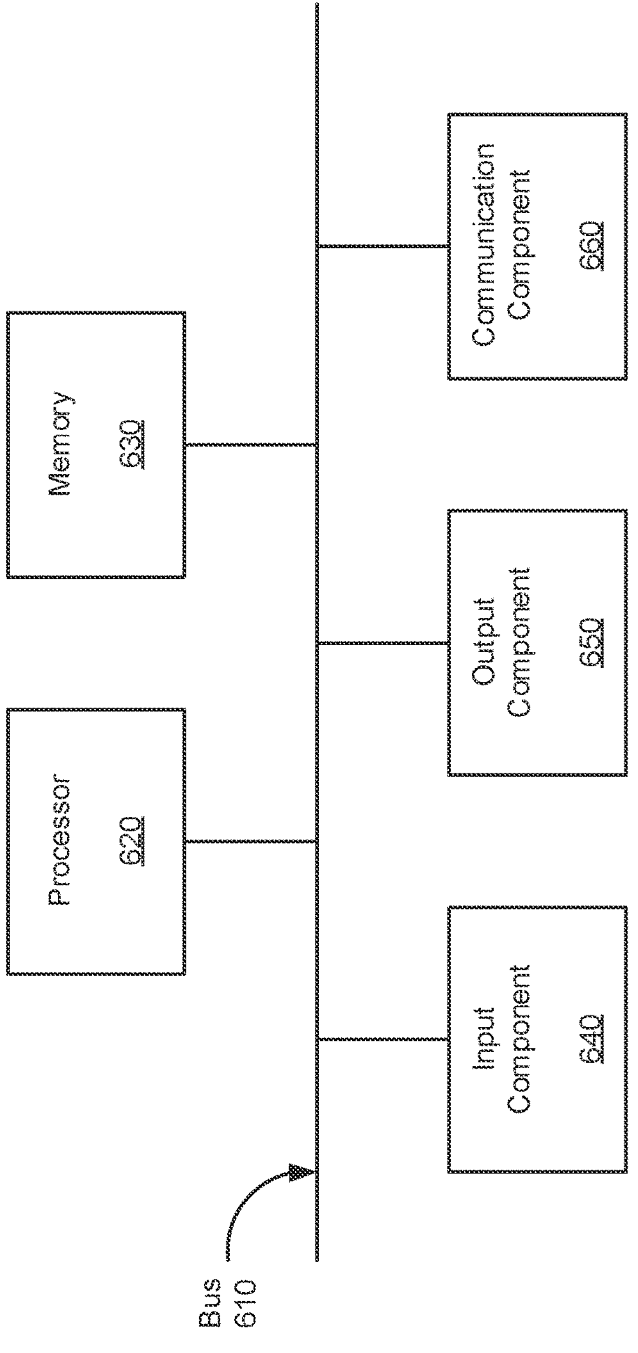
FIG. 6 is a diagram of example components of one or more devices of FIG. 5.

FIG. 6 is a diagram of example components of a device 600, which may correspond to the printer management system 510, the image capture device 520, the printer 530, and/or the user device 540. In some implementations, the printer management system 510, the image capture device 520, the printer 530, and/or the user device 540 may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
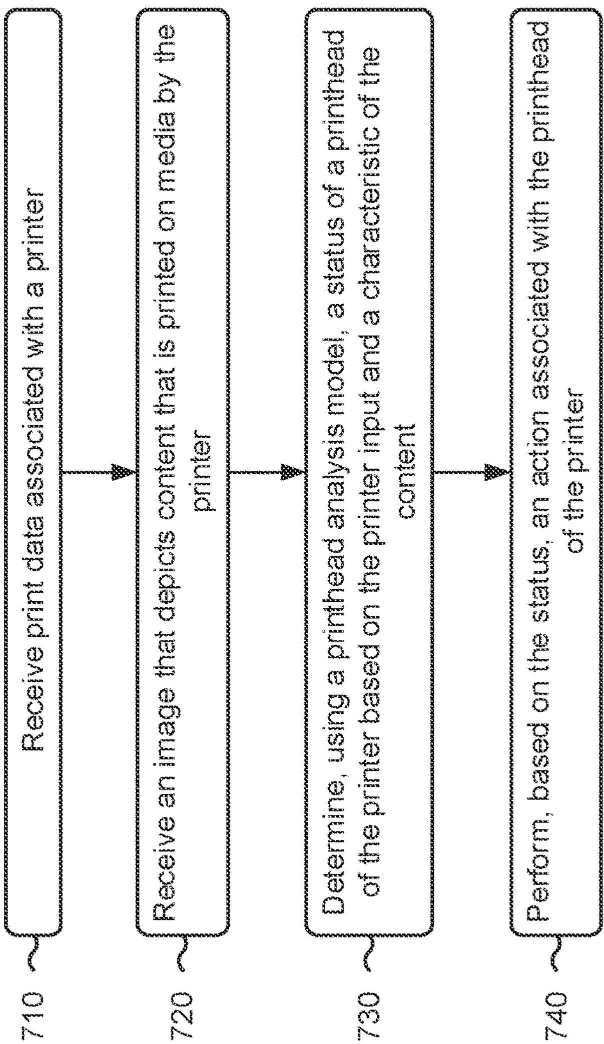
FIG. 7 is a flowchart of an example process relating to determining a printer status.

FIG. 7 is a flowchart of an example process 700 associated with utilizing a printhead resistance sensor and a model. In some implementations, one or more process blocks of FIG. 7 may be performed by a printer management system (e.g., the printer management system 510). In some implementations, one or more process blocks of FIG. 7 may be performed by another device or a group of devices separate from or including the printer management system, such as an image capture device (e.g., the image capture device 520), a printer (e.g., the printer 530), and/or a user device (e.g., the user device 540). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving print data associated with a printer (block 710). The print data may be associated with a print instruction that causes the printer to perform a printing operation. The print data may be used by the printer to control a resistance of one or more printing elements of a printhead of the printer.

As further shown in FIG. 7, process 700 may include receiving an image that depicts content that is printed on media by the printer (block 720). For example, the printer management system may receive an image that depicts content that is printed on media by the printer, as described above.

As further shown in FIG. 7, process 700 may include determining, using a printhead analysis model, a status of a printhead of the printer based on the print data and a characteristic of the content (block 730). For example, the printhead analysis model may be configured to determine a status of a printhead of the printer based on the print data and a characteristic of the content, as described above. In some implementations, the printhead analysis model may be trained based on reference data associated with historical printing operations associated with one or more printers. The reference data may include reference images associated with printed content from the historical printing operations and corresponding resistance measurements for one or more respective printheads of the one or more printers.

In some implementations, the characteristic of the content is indicative of whether the content is associated with a printing anomaly, and the status indicates whether a resistance of a printing element of the printhead satisfies a threshold for printing the content on the media. The printhead analysis model may be configured to determine a value for the threshold based on a parameter of the print data.

In some implementations, the one or more printers include multiple printers that include a first set of printers with printheads that have been used in no more than a threshold quantity of print operations, and a second set of printers with printheads that have been used in more than the threshold quantity of print operations, wherein the reference data indicates which of the historical printing operations are associated with the first set of printers and which of the historical printing operations are associated with the second set of printers.

In some implementations, the printhead analysis model may include a machine learning model that is trained according to a supervised learning technique. In such an example, the reference data may include respective historical printhead statuses associated with the one or more respective printheads that are indicated (e.g., via a user input and/or user feedback) in association with the historical printing operations. Additionally, or alternatively, the printhead analysis model may include a machine learning model that is trained according to an unsupervised learning technique. In such an example, the reference data may include respective historical printhead statuses associated with the one or more respective printheads that are detected (e.g., via one or more sensors of the printer) in association with the historical printing operations.

The printhead analysis model may include an image processing model that is configured to detect an anomaly associated with the content as depicted in the image. The printhead analysis model may determine, based on the anomaly, a resistance of the printhead when printing the anomaly within the content, wherein the status is based on the resistance.

As further shown in FIG. 7, process 700 may include performing, based on the status, an action associated with the printhead of the printer (block 740). For example, the printer management system may perform, based on the status, an action associated with the printhead of the printer, as described above.

The printer management system, to perform the action, may provide, to a user device, the status of the printhead to indicate whether the printhead is to be replaced or requires maintenance. In some implementations, the printer management system may indicate, via a user interface, the status of the printhead to indicate whether the printhead is to be replaced or requires maintenance. Additionally, or alternatively, the printer management system may retraining the printhead analysis model to analyze the printhead based on the print data, the image, and the status.

In some implementations, the printer management system may receive a resistance measurement associated with the printhead and retrain the printhead analysis model based on the print data, the image, the status, and the resistance measurement.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for determining a printhead status, comprising:

receiving, by a device, electrical resistance data associated with a printhead of a printer;

determining, by the device and using a printhead analysis model, a status of a printhead of the printer based on the electrical resistance data, wherein the printhead analysis model is trained based on reference data that includes reference images associated with printed content from historical printing operations and corresponding electrical resistance measurements for one or more respective printheads of one or more reference printers;

performing, by the device and based on the status, an action associated with the printhead of the printer;

receiving, by the device an image that depicts content that is printed on media by the printhead; and retraining the printhead analysis model based on the image and the electrical resistance data for the printhead.

2. The method of claim 1, wherein the status is indicative of whether the electrical resistance data is associated with a printing anomaly.

3. The method of claim 1, wherein the one or more printers include multiple printers that include:

a first set of printers with printheads that have been used in no more than a threshold quantity of print operations, and a second set of printers with printheads that have been used in more than the threshold quantity of print operations, wherein the reference data indicates which of the historical printing operations are associated with the first set of printers and which of the historical printing operations are associated with the second set of printers.

4. The method of claim 1, wherein the printhead analysis model comprises a machine learning model that is trained according to a supervised learning technique, wherein the reference data includes respective historical printhead statuses associated with the one or more respective printheads that are indicated in association with the historical printing operations.

5. The method of claim 1, wherein performing the action comprises at least one of:

providing, to a user device, the status of the printhead to indicate whether the printhead is to be replaced or requires maintenance, indicating, via a user interface, the status of the printhead to indicate whether the printhead is to be replaced or requires maintenance, or retraining the printhead analysis model to analyze the printhead based on the print data, the image, and the status.

6. A device, comprising:

one or more memories; and one or more processors, coupled to the one or more memories, configured to:

receive electrical resistance data associated with a printhead of a printer;

determine, using a printhead analysis model, a status of a printhead of the printer based on the electrical resistance data, wherein the printhead analysis model is trained based on reference data that includes reference images associated with printed content from historical printing operations and corresponding electrical resistance measurements for one or more respective printheads of the one or more printers; and perform, based on the status, an action associated with the printhead of the printer, wherein the printhead analysis model comprises a machine learning model that is trained according to an unsupervised learning technique, wherein the reference data includes respective historical printhead statuses associated with the one or more respective printheads that are detected in association with the historical printing operations.

7. The device of claim 6, wherein the status is indicative of whether the electrical resistance data is associated with a printing anomaly.

8. The device of claim 6, wherein the one or more printers include multiple printers that include:

a first set of printers with printheads that have been used in less than or equal to a threshold quantity of print operations, and a second set of printers with printheads that have been used in more than the threshold quantity of print operations, wherein the reference data indicates which of the historical printing operations are associated with the first set of printers and which of the historical printing operations are associated with the second set of printers.

9. The device of claim 6, wherein the one or more processors, to perform the action, are configured to:

provide, to a user device, the status of the printhead to indicate whether the printhead is to be replaced or requires maintenance, indicate, via a user interface, the status of the printhead to indicate whether the printhead is to be replaced or requires maintenance, or retrain the printhead analysis model to analyze the printhead based on the print data, the image, and the status.

10. A tangible machine-readable medium storing a set of instructions, the set of instructions comprising:

one or more instructions that, when executed by one or more processors of a device, cause the device to:

receive electrical resistance data associated with a printhead of a printer;

determine, using a printhead analysis model, a status of a printhead of the printer based on the electrical resistance data, the printhead analysis model is trained based on reference data that includes reference images associated with printed content from historical printing operations and corresponding electrical resistance measurements for one or more respective printheads of a plurality of reference printers; and perform, based on the status, an action associated with the printhead of the printer, wherein the plurality of reference printers include:

a first set of printers with printheads that have been used in less than or equal to a threshold quantity of print operations, and a second set of printers with printheads that have been used in more than the threshold quantity of print operations, wherein the reference data indicates which of the historical printing operations are associated with the first set of printers and which of the historical printing operations are associated with the second set of printers.

11. The tangible machine-readable medium of claim 10, wherein the status indicates whether the electrical resistance data of the printhead is associated with a printing anomaly.

12. The tangible machine-readable medium of claim 10, wherein the one or more instructions, that cause the device to perform the action, cause the device to:

provide, to a user device, the status of the printhead to indicate whether the printhead is to be replaced or requires maintenance, indicate, via a user interface, the status of the printhead to indicate whether the printhead is to be replaced or requires maintenance, or retrain the printhead analysis model to analyze the printhead based on the print data, the image, and the status.

* * * * *